Dec. 12, 1944. J. H. BEATTY 2,364,614
RAW-STATE PRESERVING PROCESS AND COMPOSITION
Filed Jan. 11, 1943
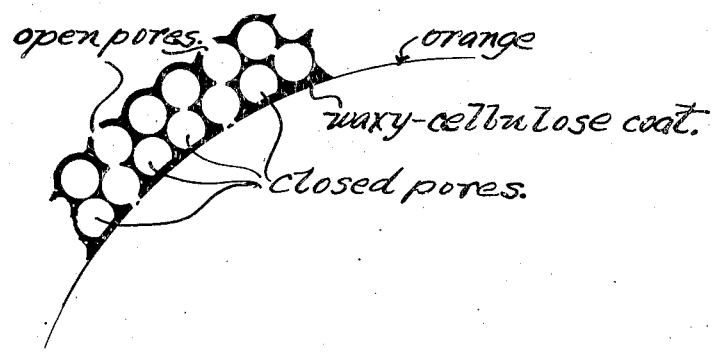

UNITED STATES PATENT OFFICE 2,364,614

RAW-STATE PRESERVING PROCESS AND COMPOSITION

Joseph Harold Beatty, Anaheim, Calif.

Application January 11, 1943, Serial No. 471,995

10 Claims. (Cl. 99—166)

The raw preservation of fresh fruits, fresh vegetables, and also fresh eggs is a problem of very great concern at all times for maintenance of life and is more so in times of war and other disasters, particularly when earthwide in scope, and this invention is a means and a method for materially increasing the "keeping" period of time of fresh foods, such as oranges and vegetables; especially cantaloups. It is unnecessary to catalog the food bodies within the range of application of this invention, along with numerous other kinds of articles whose exposed surfaces should, desirably, be protected and incidentally glazed.

In the successful practice of raw preservatiton of fresh vegetative bodies (oranges will hereinafter be used for an example) it is a primary factor that when this article is packed (not solidly compressed) as large and as free air spaces as reasonably possible be maintained for copious flow of fresh air between the necessarily interengaged articles packed in a given container (generally an open slot box).

In current, packer practice, sized, picked oranges are, for distal trade, individually wrapped in paper and then placed, somewhat in layers, in the box and the bulging mass is subjected to considerable pressure by application of the lid. There are numerous objections to that practice: (1) cost, time and labor of pack-in wrappers, (2) the papers hold in dead air about each orange and favor decay, (3) the mass of paper effectively checks any flow of (possibly cool) fresh air through the packed box, (4) and the individual fruit bodies are at once compressed out of natural shape and made to have greater surface juxtaposition (at the interposed paper) and therefore more tendency to spoil because of expulsion of oil and acids at the areas of skin contiguity, with the natural result of bacterial interaction. An object is elimination of all these objections. And at the same time to provide a means which and method which will produce a raw, packed fruit having quite the same natural shape as when picked.

A further object is to provide a coating material and method which will allow the orange to be subjected to some packing pressure-effects and to naturally but slowly shrink with age (after packing) without opening of the coating, and which coating, therefore, will give long period protection to the marketed oranges. In this connection an object is to provide a cover coating having certain inherent properties found to be highly effective in providing for a slow respiration of vapors from the fruit and at the same time retarding natural oxidation of the fruit juice in situ with the great benefit that the juice and the meat of the fruit retains its naural flavor, size and color and attractive unwithered appearance for a longer period of time than the treated product of other known processes and means, and than untreated fruit.

Also, an object of the invention is to provide a coating and protecting method which eliminates all requirement for refrigeration in packing house, in transport, and storage, and at sales markets, gives a desired, but not excessive gloss and altogether makes for increased saleability of the fruit—displayed without wrappers.

Particularly, the invention involves the very important concept of providing a means and a method which effectively somewhat stiffens the fruit rind—makes it more superficially rigid—for a few days after the initial treatment of the fruit by the here disclosed invention, and thus contributing to the accomplishment of the above mentioned air circulation objective.

A high desideratum is to provide a fresh-condition preservation of the fruit by the application of a thin, tough, uniform-thickness film of high adheresence; this latter having a direct interrelation with the increased rigidification of the fruit body.

The invention consists in certain advancements in this art as set forth in the ensuing disclosure and having, with the above, additional objects and advantages as hereinafter developed, and whose compositional embodiment and details thereof, and the method will be made manifest in the following description of the herewith expositional way and means; it being understood that modifications, variations and adaptations may be resorted to within the scope, principle and spirit of the invention as it is more particularly claimed presently.

The drawing is a diagram in greatly increased section of a fragment of a round fruit and its protecitve coating film.

The coating of this invention is a mixture of readily atomized fluid consistency of suitable parts of preferably nitrocellulose lacquer and a solvent therein, and a desired wax or wax-like substance; this in a quite small proportion.

A preferred modern lacquer in this process is made of nitro-cellulose, resin, a plasticizer, a pigment (if desired), and solvents and diluents. Nitro-cellulose is functionally the film-forming medium and resin is used to give body to the coat and increase adhesion and give gloss: the toughness of the film is secured by the cellulose base. This is a carbohydrate of the empirical formula $C_6H_{10}O_5$—$x$ and constitutes the tissue of vegetable cell wall.

When this thin mixture is sprayed onto the skin of an orange a thin coat is formed and the solvent will quickly evaporate. The natural process of evaporation of the solvent will ultimately make the entire film of the cellulose ingredient highly porous. Without the introduction of a desired filler the degree of porosity of the thin film will be much greater than is essential and an objectionable loss of the oils and vapors of the fruit is the result.

It is therefor that a preferably transparent ingredient is incorporated in a dissolved state with the desired cellulose lacquer to produce a reduction in the porosity of the final film but allowing ample windows for the essential breathing and ventilation at a reduced capacity for loss of oils and vapors. It is this checked exudation of vapors from oils and juices which is the high keeping factor of this peculiar cellulose lacquer and wax, nearly fluid gel when it congeals as a film after it is sprayed (in preference) onto a fruit—fresh, dry and clean. The mixture originally, as well as the applied film, are kept as free from water as is practically feasible. It is hygroscopic water taken up by a picked, and thus naturally decomposing, fruit body that accelerates bacteriological destruction; it being well known that such action is stopped or delayed in a dry atmosphere. In the latter case the fruit is naturally desiccated and in wet air it naturally molds.

The presented process and coat checks too quick a drying out in a dry atmosphere and in a damp atmosphere retards bacteric inception.

It is not to be understood that any special cellulose group is here delimited since any which will suffice for the results may be employed; say a nitro-cellulose group, or a cellulose acetate group, or other equivalents well known in the chemical arts, and which may be adopted in the ken of this invention. Various kinds, grades or qualities of ceriferous components may be used. Wax ceresin is preferred because of its preserving quality and the simplicity by which it is dissolved in the lacquer without other ingredients.

The components are all brought to a warm state (say 108° F. or thereabout) to be desirably fluent for best intermixing and for application to the fruit in the preferred mode.

For the effective treatment of oranges a mixture more or less in the herebelow formula; by weight: range of 55% to 80% of a preferably clear, water white cellulose lacquer; 42% to 19% of a suitable volatile solvent (an ethereal medium which will thin the said lacquer); 3% to 1% of a suitable filler (a soluble ceretic ingredient).

An economical and very satisfactory solution for producing a tenacious and closely adherescent layer on the fruit or body to be protected consists in substantially the following materials and ratio, namely, cellulosic lacquer—62%; an evaporative thinner—37% and wax (ceresin)—1.00%.

The divers components are brought to a temperature which will permit of their thorough intermixture and in their application to the given body to be coated are brought to a free flowing viscosity, and if sprayed to effect a coverage the apparatus employed is kept suitably warm: In warm atmospheres extraneous application of heat may not be needed. It is to be understood that there may be a considerable range from the stated proportions of the ingredients as will be deemed by the expert according to all conditions incident and having in mind the great diversity of formulae with respect to the cellulose principle; this may be from any chosen group as by way of suggestion; solutions of nitrocellulose, cellulose acetate.

The ultimately dry or evaporated film (the solvents having escaped) gives a good sheen. The mixture is preferably applied without the use of brushing apparatus and therefore eliminates dangerous abrading injury to the fruit skin. It is found that as the solvents escape from the applied liquid coat on the rind the film becomes porous and this state allows the fruit to "breathe." The waxy ingredient constitutes a measurable filler and thus reduces porosity and forms a water excluding mat sufficiently apertured to permit the stated breathing but also holding back the desired vapors which flavor the fruit meat. Reducing porosity of the film makes it less capillary—keeps air moisture out and keeps the fruit vapors in, and the wax is a water proofer, in the porous film, and retards oxidation thereof.

What is claimed is:

1. A cellulose wax gel adapted for use as a tenacious adherescent protective coat for fresh food bodies.

2. A process consisting of applying an evaporative non-aerated gel solution of cellulose and wax parts to make an adherescent, porous coat on the surface of a body of food substance; whereby upon drying out of the coat objectional growth of decompositions effects will be retarded.

3. A process for the temporary rigidification of fresh, dry, untreated food substance bodies to withstand some packing pressure without undue deformation, which consists of applying to the surface of the body an evaporative substantially shellacless wax inclusive film of a composition principally of a cellulose ingredient thinned by a fugitive solvent and which film dries into a thin layer closely adherent to the said surface.

4. A process, for raw preservation of fresh bodies by retardation of exudation of vapors thereof and with the desired issue of gases of decomposition, which comprises applying to the fruit surface a self-drying, cover-forming liquid consisting of a cellulose lacquer and a waxy filler which reduces the porosity due to evaporation of the lacquer and which liquid dries as a thin, closely adherescent layer.

5. That method for prolonging the raw keeping period of fresh, clean fruit, and vegetable and other desired bodies which consists of spreading over the exposed surface thereof a nitro-cellulose lacquer thinned by a volatile ingredient and including a waxy water repellent and which dries into a closely adherescent, porous layer; thereby enabling the desired escape of certain decomposition gases and at the same time resisting the escape of moisture content of the covered surficial body.

6. A raw fruit protective surface cover substantially free of resin part and including a cellulose principle thinned by an evaporative liquid which upon evaporation will make the cellulose film porous when dry, and the cover including a waxy filler medium.

7. A raw fruit protective including a principle applicable in non-aerated liquid gel form and including an evaporative solvent and which, upon drying after a thin application to the body to be protected, will be a somewhat porous, tightly adherescent layer, and a waxy filler in the gel.

8. A fresh, raw fruit or vegetable body coating for external use consisting of a fluid intermixture of non-aerated thinned cellulose lacquer, and a ceretic ingredient to increase water resistance of the dried film formed on the lacquer covered body; the said film being closely adherescent to the body.

9. The preservative of claim 8, and which ingredient reduces capillarity of the film.

10. A protective for increasing the keeping period of fresh food bodies in an otherwise unpreserved state which consists of a substantially liquid intermixture in substantially the following materials and ratio:

| | Per cent |
|---|---|
| Cellulosic lacquer | 62.00 |
| An evaporative thinner | 37.00 |
| Wax (ceresin) | 1.00 |

JOSEPH HAROLD BEATTY.